United States Patent [19]

Binkert

[11] Patent Number: 4,576,116

[45] Date of Patent: Mar. 18, 1986

[54] COLLAPSIBLE HOUSE FOR CATS

[76] Inventor: Gerald A. Binkert, 308 Gould Ave. SE., Bemidji, Minn. 56601

[21] Appl. No.: 699,012

[22] Filed: Feb. 7, 1985

[51] Int. Cl.⁴ .............................................. A01K 1/02
[52] U.S. Cl. ...................................................... 119/19
[58] Field of Search ..................................... 119/1, 19

[56] References Cited

U.S. PATENT DOCUMENTS

| D. 225,121 | 11/1972 | Mashburn | D30/1 |
| 109,166 | 11/1870 | Achenbach | 119/19 |
| 2,170,379 | 8/1939 | Ortt | 119/19 |
| 2,441,058 | 5/1948 | Carwile | 119/83 |
| 3,085,551 | 4/1963 | Helmer | 119/1 |
| 3,156,213 | 11/1964 | Patten | 119/19 |
| 4,008,687 | 2/1977 | Keys | 119/1 |
| 4,085,762 | 4/1978 | O'Brian et al. | 135/4 |
| 4,195,593 | 4/1980 | Dunn | 119/19 |
| 4,347,807 | 9/1982 | Reich | 119/19 |

Primary Examiner—Hugh R. Chamblee
Attorney, Agent, or Firm—Robert C. Baker

[57] ABSTRACT

A collapsible A-frame house providing a common site for a cat to rest, exercise and play comprised of a roof of carpet-like material including two integral roof panels with their bottom edges connected to opposing edges of a floor panel also of carpet-like material. Stiffening panels are affixed onto the backside of the roof panels. A cord has two ends slidably passing through the peak into the house, with cat amusement objects connected to each end. The cord additionally provides a manual handle for lifting the house.

10 Claims, 5 Drawing Figures

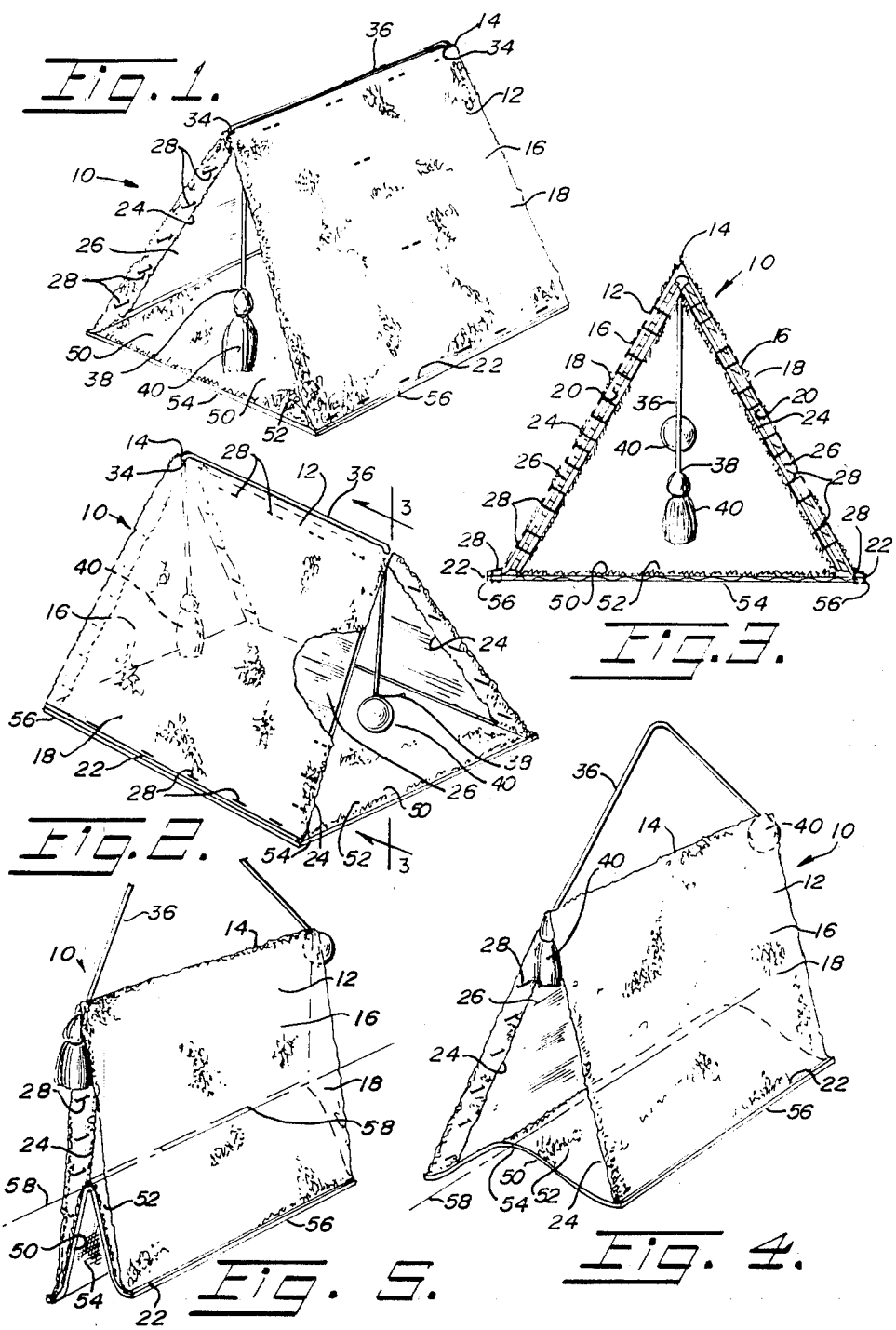

COLLAPSIBLE HOUSE FOR CATS

BACKGROUND OF THE INVENTION

The present invention relates to pet accessories, and more particularly to a collapsible A-frame house providing a common site for a cat to rest, exercise and play.

All cats of the household type have an inherent yearning to sharpen and exercise their claws by periodic scratching or clawing. Loosely woven fabric covered surfaces within a house, such as on furniture or drape fabrics, are particularly susceptable to being torn or shredded by such cat clawing. To help prevent such destructive tendencies, a typical cat owner may provide the cat with a scratching post where the cat may exercise its claws without damage to household furnishings and without fear of reprisal from the owner.

Household cats are inquisitive and playful. These traits require that the cat owner provide objects that will provide amusement and entertain the cat. Balls, bells, miniature plastic toys or the like may be used to entertain the cat. Cats do, however, quickly become bored with inanimate objects. Furthermore, such objects may become lost or actually hidden somewhere within the household by the cat. Without amusing objects for entertainment, the cat may undesirously turn to household items for play and exercise and entertainment.

However, insofar as is known, devices heretofore especially designed for cats are, too frequently, bulky, unattractive and not readily collapsible or portable.

This invention provides, for the first time insofar as is known, a single collapsible article which incorporates features and functions of high attractiveness to cats in going about their daily essential activities of rest, exercise, and play.

SUMMARY OF THE INVENTION

This invention is directed to a collapsible A-frame house which provides a common site for a cat to rest, exercise and play. The house is comprised of a roof formed of a single unitary continuous flexible layer-type material, preferably a carpet-like material. The roof has an elongate peak and two roof panels integral with the peak and depending downwardly and outwardly from the peak. A stiffening panel is suitably affixed on the back side of each roof panel. A floor panel, preferably of carpet-like material, is provided and has two opposing edged suitably affixed to bottom edges of the roof panels. A cord slidably passes through the peak and into the house, with cat amusement objects connected to the ends of the cord. The pile face side of the carpeting is appropriately on the outside of the roof and the top side of the floor.

The outward pile face of the roof panels provides an attractive place adapted to withstand cat clawing, including claw gripping, claw pulling, and claw sure foot traction. The stiffening panels of each roof panel assist in preventing the roof from collapsing when the cat is climbing on top of the house. The floor panel holds the roof panels at the limit of their separation distance from each other at the floor panel level, while the top side pile face of the floor panel provides a comfortable place, which is somewhat secluded, for the cat to rest undisturbed.

When collapsing the house for storage or transport, the house is initially lifted by the cord adjacent the peak. The carpeting along the elongate peak will flex in a hinge-like manner to permit inward dropping movement of the roof panels towards one another as the house is lifted off a surface such as a floor. The flexible nature of the floor panel permits an upward folding or buckling of the floor along its longitudinal center line to thereby completely collapse the house into a folded condition.

While the cord provides a handle, it also has a further function. The pulling of one of the moveable play objects by a cat will correspondingly raise and animate the other object, much to a cat's amusement.

BRIEF DESCRIPTION OF THE DRAWINGS

FIG. 1 is a perspective view of an A-framed collapsible house according to the invention;

FIG. 2 is another perspective view of the collapsible A-frame house;

FIG. 3 is a cross sectional view along line 3—3 of FIG. 2;

FIG. 4 is a perspective view of the house beginning to collapse; and

FIG. 5 is a perspective view of the collapsed A-frame house.

DETAILED SPECIFICATION

Referring to FIG. 1, a collapsible A-frame house 10 according to the invention is generally comprised a roof 12 with stiffening panels 26 and a floor 50 connected to the roof 12. Roof 12 and floor 50 are preferably each made of a single piece of carpeting, although other cushiony material including loosely woven or napped fabric may used. The most preferred carpeting material to employ is that having a jute or imitation (synthetic) jute-like backside.

Carpeting is durable while having an attractive soft pile face with outward strands and/or loops suitable for a cat to grip with its claws and engage in exercise by pulling on the pile. The pile face is most significant and also provides sure foot traction for climbing about roof 12. Carpeting furthermore is relatively flexible to permit folding, bending or flexing in a hinge-like manner.

As shown in FIGS. 1, 2 and 3, roof 12 is formed of a single unitary continuous flexible layer-type material having a backside and a cushiony outward face. The roof formed of this material has an elongate peak 14 with integral carpet roof sections or panels 16 depending downwardly and outwardly therefrom. Roof panels 16 each have an outward pile face 18 and a backside 20 with a bottom edge 22 and two opposing side edges 24. Stiffening panels 26 may be thin wood particle boards or the like and are each affixed to the backside 20 of each of the roof panels 16, suitably by staples 28. Staples 28 are preferable because they may be hidden from view in the pile of the carpeting. Preferably the staples are pressed through the stiffening panels 26 and the ends of the staples hidden in the pile of the carpet. Stiffening panels 26 are appropriately not connected to each other; and in this respect, the house is formed without any frame as such. The house lacks a base frame of connected elements. Side edges 24 of the carpet are preferably folded inwardly upon the discrete stiffening panels 26 and affixed thereat by staples 28. This folding of side edges 24 adds a finished look to house 10 and further stiffens the sections of the carpet characterized as roof panels 16.

Elongate peak 14 has apertures 34 near its opposing ends. Cord 36 has cord ends 38 which slidably pass through apertures 34 into house 10. Cat amusement objects 40, such as a ball, bell, tassel, or other toy, are suitably connected to cord ends 38 and thereby will not permit ends 38 to pass out of house 10. Cord 36 will move or slide through apertures 34 when either end 38 is pulled.

Floor 50 has a top pile face 52 and backside 54 with opposing edges 56. Edges 56 are suitably affixed by staples 28 to corresponding bottom edges 22 of roof panels 16 to prevent or limit bottom edges 22 in their degree of distance separation from each other. By this arrangement, roof panels 16 will stand upwardly inclined and bear upon each other along elongate peak 14.

A cat may claw at pile face 18 of roof panel 16 and readily climb about roof 12. The cat may also bat or pull at either object 40 from within house 10 or from on top of roof 12. Because cord 36 slidably passes through the apertures at the end portions of peak 14, any pull by a cat on one object 40 will move and animate the other object 40, much to the cat's amusement. Soft pile face 52 of floor 50 provides an attractive, comfortable and somewhat hidden place for the cat to rest undisturbed.

Referring to FIGS. 4 and 5, the collapsing operation of house 10 may be seen. Because roof panels 16 are integrally connected along peak 14 and the stiffening panels 26 are not connected, the carpeting along elongate peak 14 will flex in a hinge-like manner. The carpeting adjacent the juncture of bottom edges 22 and opposing edges 56 will also bend or flex. When roof panels 16 are moved inwardly towards one another, floor 50 tends to buckle or fold upwardly along its longitudinal center line 58 until it is sandwiched between roof panels 16 and house 10 is in its collapsed condition as specifically shown in FIG. 5. The collapsed house 10 may then be conveniently stored, as by hanging it from cord 36 in a closet, or by slipping it under furniture such as a sofa. It is conveniently transported by manually gripping the cord 36 and using the cord as a handle.

Cord 36 also may be used to aid in collapsing house 10. Initially, cord 36 adjacent elongate peak 14 is grasped and lifted until objects 40 permit no further withdrawal of cord 36 from the inside of house 10. Further lifting will raise bottom edges 22 away from a floor or supporting surface upon which the collapsible house 10 rests, and will permit the inward dropping movement of roof panels 16 towards one another. Floor 50 simultaneously begins to buckle or fold upwardly along its center line 58. One may use a guiding hand to lift at the center line of floor 50 and encourage such collapsing movement.

From its folded position, collapsed house 10 may be easily erected by moving roof panels 16 away from each other until floor 50 unfolds and permits no further roof panel spread. House 10 will then stand on a substantially flat supporting surface. In essence, erecting the house 10 is the reverse of collapsing the house 10.

The present invention may be embodied in other specific forms without departing from the spirit or essential attributes thereof. Therefore, the illustrated embodiment should be considered in all respects as illustrative and not restrictive, reference being made to the appended claims rather than to the foregoing description to indicate the scope of the invention.

That which is claimed is:

1. A collapsible A-frame house providing a common site for a cat to rest, exercise and play, comprising (a) a roof formed of a single unitary continuous flexible layer-type material having a backside and a cushiony outward face, said roof including an elongate peak and two roof panels integral with the peak and depending downwardly and outwardly from the peak, each said roof panel having a bottom edge, the outward face of the flexible layer-type material being the outward face of the roof and being adapted to withstand cat clawing, the peak of the roof being adapted for flexing in a hinge-like manner to permit inward movement of the roof panels toward one another when the house is to be collapsed;

(b) a stiffening means on the backside of each roof panel for supporting the same;

(c) a floor panel formed of a single unitary continuous flexible layer-type material having a bottom side and a cushiony top side, said floor panel having opposing edges thereof affixed to the bottom edges of the roof panels to limit the separation distance between said bottom edges, the floor panel being adapted for folding along its longitudinal center line generally parallel to its opposing edges, and the flexible layer-type material adjacent the junction of the bottom edges of the roof panels and the opposing edges of the floor panel being such as to serve a hinge function for allowing the floor panel to fold as the roof panels move inwardly towards one another in collapsing the house into a folded condition; and (d) a cord having two ends slidably passing through opposite end portions of the peak into the house, said cord having at least one object connected to each end for cat amusement and for preventing the cord ends from passing out of the peak when the cord is employed as a manual handle for lifting the house.

2. The house of claim 1 wherein the roof and the floor panel are comprised of a carpet-like material with a pile-like surface, the pile-like surface being the outward face of the roof and the top side of the floor panel.

3. The house of claim 1 wherein the floor panel is adapted for folding inwardly between the roof panels.

4. The house of claim 1 wherein each said stiffening means comprises a stiff discrete panel member stapled to the backside of a roof panel.

5. The house of claim 1 wherein the floor panel is affixed to the bottom edges of the roof panels by staples.

6. The house of claim 1 wherein each roof panel has its opposing side edges folded inwardly upon the stiffening means and affixed thereto.

7. A collapsible A-frame house providing a common site for a cat to rest, exercise and play, comprising (a) a roof of carpet-like material with a backside and an outward pile-like face including an elongate peak and two roof panels integral with the peak and depending downwardly and outwardly from the peak, each roof panel having a bottom edge, the outward pile-like face being adapted to withstand cat clawing, the peak of the roof being adapted for flexing in a hinge-like manner to permit in inward movement of the roof panels toward one another when the house is to be collapsed;

(b) a stiffening panel affixed to the backside of each roof panel for supporting the same; and (c) a unitary floor panel of carpet-like material with a top pile-like face and having opposing edges affixed to bottom edges of the roof panels to limit the separation distance between the bottom edges, the floor panel being adapted for folding inwardly between the roof panels to form a crease of fold along its longitudinal center line generally parallel to the opposing edges, and the carpet-like material adjacent the junction of the bottom edges of the roof panels and the opposing edges of the floor panel being such as to serve a hinge function for allowing the floor panel to fold as the roof panels move inwardly toward one another in collapsing the house into a folded condition.

8. The house of claim 7 additionally comprising a cord having two ends slidably passing through end portions of the peak into the house, said cord having at least one object connected to each end for cat amusement and for preventing the cord ends from passing out of the peak when the cord is employed as a manual handle for lifting the house.

9. The house of claim 7 wherein the floor panel is afffixed to the bottom edges of the roof panel by staples.

10. A collapsible A-frame house providing a common site for a cat to rest, exercise and play, comprising
 (a) a roof formed of a single unitary continuous flexible layer-type material having a backside and a cushiony outward face, said roof including an elongate peak and two roof panels integral with the peak and depending downwardly and outwardly from the peak, each said roof panel having a bottom edge, the outward face of the flexible layer-type material being the outward face of the roof and being adapted to withstand cat clawing, the peak of the roof being adapted for flexing in a hinge-like manner to permit inward movement of the roof panels toward one another when the house is to be collapsed;
 (b) a stiffening means on the backside of each roof panel for supporting the same; and
 (c) a floor panel formed of a single unitary continuous flexible layer-type material having a bottom side and a cushiony top side, said floor panel having opposing edges thereof affixed by staples to the bottom edges of the roof panels to limit the separation distance between said bottom edges, the floor panel being adapted for folding along its longitudinal center line generally parallel to its opposing edges, and the flexible layer-type material adjacent the junction of the bottom edges of the roof panels and the opposing edges of the floor panel being such as to serve a hinge function for allowing the floor panel to fold as the roof panels move inwardly towards one another in collapsing the house into a folded condition.

* * * * *